US008326014B2

(12) United States Patent
Wong et al.

(10) Patent No.: US 8,326,014 B2
(45) Date of Patent: Dec. 4, 2012

(54) METHODS AND SYSTEMS FOR PROCESSING BIOLOGICAL SPECIMENS UTILIZING MULTIPLE WAVELENGTHS

(75) Inventors: Kam Lin Wong, Bedford, MA (US); David Zahniser, Wellesley, MA (US); Kathy Mui, Chelmsford, MA (US); James Linder, Omaha, NE (US); Howard Kaufman, Newton, MA (US)

(73) Assignee: Cytyc Corporation, Marlborough, MA (US)

( * ) Notice: Subject to any disclaimer, the term of this patent is extended or adjusted under 35 U.S.C. 154(b) by 1467 days.

(21) Appl. No.: 11/864,744

(22) Filed: Sep. 28, 2007

(65) Prior Publication Data

US 2009/0087074 A1 Apr. 2, 2009

(51) Int. Cl.
*G06K 9/00* (2006.01)

(52) U.S. Cl. ........................................ 382/133

(58) Field of Classification Search .................. 382/128, 382/133, 134; 702/19, 21; 435/4, 7.2, 40.5; 348/80
See application file for complete search history.

(56) References Cited

U.S. PATENT DOCUMENTS 4,125,828 A * 11/1978 Resnick et al. ............... 382/134
5,627,908 A * 5/1997 Lee et al. ...................... 382/133
5,732,150 A * 3/1998 Zhou et al. .................... 382/133
5,828,776 A * 10/1998 Lee et al. ...................... 382/133
5,889,880 A 3/1999 Doerrer et al.
6,134,354 A * 10/2000 Lee et al. ...................... 382/270
6,252,979 B1 * 6/2001 Lee et al. ...................... 382/133
6,571,118 B1 * 5/2003 Utzinger et al. .............. 600/476
6,620,591 B1 * 9/2003 Dunlay et al. ................. 435/7.2
6,633,662 B2 * 10/2003 Ravkin .......................... 382/133
7,092,557 B2 * 8/2006 Eisfeld et al. ................. 382/128
7,139,415 B2 * 11/2006 Finkbeiner .................... 382/128
2003/0231791 A1 * 12/2003 Torre-Bueno et al. ........ 382/133
2004/0126008 A1 * 7/2004 Chapoulaud et al. ......... 382/156
2004/0253616 A1 12/2004 Wong et al.
2004/0254738 A1 12/2004 Zahniser et al.
2006/0245630 A1 11/2006 Zahniser et al.
2008/0051664 A1 * 2/2008 Demos et al. ................. 600/473

FOREIGN PATENT DOCUMENTS

WO 9908091 2/1999
WO 2007028944 3/2007

OTHER PUBLICATIONS

Lerner et al ("feature Representation and Signal Classifiaction in Fluorescence In-Situ Hybridization Image Analysis", IEEE Transactions on Systems, Man and Cybenetics-Part A: Sytems and Humans, vol. 31, No. 6, Nov. 2001.*

(Continued)

*Primary Examiner* — Jason M. Repko
*Assistant Examiner* — Shervin Nakhjavan
(74) *Attorney, Agent, or Firm* — Vista IP Law Group LLP

(57) ABSTRACT

Methods, systems and computer readable media for processing one or more biological specimens carried by specimen slides. Images of objects in a specimen are acquired and objects of interest in the acquired images are identified. Additional images of identified objects of interest may be acquired at multiple wavelengths. Cellular features of objects of interest are extracted from images and may be used for classifying the specimen, e.g., as normal or suspicious/abnormal, based a probabilistic model that utilizes the extracted features.

27 Claims, 11 Drawing Sheets

OTHER PUBLICATIONS

PCT Search Report and Written Opinion for PCT/US2008/076205 from the International Searching Authority, Applicant Cytyc Corporation, Forms PCT/ISA/210, 220 and 237, mailed Feb. 5, 2009 (14 pages).
Chinese Office Action for CN Application No. 200880108630.3 Mailed on Mar. 23, 2012.
English Translation of Chinese Office Action for CN Application No. 200880108630.3 Mailed on Mar. 23, 2012.
Taiwanese Office Action for TW Application No. 097135808 Mailed on Feb. 22, 2012.
English Translation of Taiwanese Office Action for TW Application No. 097135808 Mailed on Feb. 22, 2012.
Communication Pursuant to Rules 161(1) and 162 for EP Application No. 08836660.4 Mailed on May 7, 2010.
Response to Communication Pursuant to Rules 161(1) and 162 for EP Application No. 08836660.4 Filed on Jun. 16, 2010.
Communication Under Rule 71(3) for EP Application No. 08836660.4 Mailed on Apr. 26, 2012.

* cited by examiner x = APA (Average Probability That Object Is Artifact)(First Probability Function)

y = Probability That Specimen Is Normal (Second Probability Function)

1220 x Normal specimens classified as normal (130)
1221 o Normal specimen not classified as normal (140)
1222 ☒ Abnormal specimen not classified as normal (140)
1223 ◙ Abnormal specimen classified as normal (140)

~ 20% probability that specimen is normal
~ 10% probability that OII of specimen is artifact

1300

| Cell Type (1301) | Count (1302) |
| --- | --- |
| Normal | 3557 |
| SM | 95 |
| EC | 126 |
| EM | 2 |
| BCC | 462 |
| ASCUS | 728 |
| AGUS | 54 |
| KOILOCYTE | 98 |
| LSIL | 1737 |
| HSIL | 600 |
| Cancer | 335 |
| Unclassified Abnormal | 1288 |
| Talc | 4 |
| Herpes | 36 |
| WBC | 485 |
| Debris | 984 |
| Apoptosis | 113 |
| Total | 10704 |

1310 (Talc, Herpes, WBC, Debris, Apoptosis)

FIG. 13

METHODS AND SYSTEMS FOR PROCESSING BIOLOGICAL SPECIMENS UTILIZING MULTIPLE WAVELENGTHS

FIELD OF THE INVENTION

The present invention is related to systems and methods for characterizing or classifying biological specimens.

BACKGROUND

In the medical industry, there is often a need for a laboratory technician, e.g., a cytotechnologist, to review a cytological specimen for the presence of specified cell types. For example, there is presently a need to review a cervical-vaginal Papanicolaou (Pap) smear slides. Pap smears have been a powerful tool for detecting cancerous and precancerous cervical lesions. The reliability and efficacy of a cervical screening and screening of other specimens is measured by its ability to diagnose precancerous lesions (sensitivity) while at the same time avoiding false positive diagnosis (specificity). In turn, these criteria depend on the accuracy of the cytological interpretation.

Traditionally, a pathologist may perform a single cell analysis on a biological specimen by looking at the characteristics of individual cell nuclei, or a contextual analysis on the biological specimen by looking for characteristic patterns in the architecture of the cells as they appear on the slide. To facilitate this review process, automated screening systems have been developed to process multiple microscope slides. In a typical system, an imager is operated to provide a series of images of a cytological specimen slide, each depicting a different portion of the slide. A processor or controller then processes the image data to furnish quantitative and prognostic information about the specimen. The processor can perform either a single cell analysis or a contextual analysis, or both, in providing this diagnostic information.

In some automated screening systems, the processor uses the diagnostic information to delineate between normal and abnormal or suspicious biological material within each specimen. That is, the processor will focus the cytotechnologist's attention on the most pertinent cells, with the potential to discard the remaining cells from further review. In this case, the screening device uses the diagnostic information to determine the most pertinent biological objects and their locations on the slide. This location information is provided to a review microscope, which automatically proceeds to the identified locations and centers on the biological objects for review by the cytotechnologist. The cytotechnologist can then electronically mark the most pertinent biological objects (for example, objects having attributes consistent with malignant or pre-malignant cells) for further review by a pathologist.

For example, in one automated system, objects or "objects of interest" (OOIs) are identified based on the image data. Objects or OOIs may take the form of individual cells and cell clusters of the specimen. The system may be configured to rank identified areas or objects, e.g., based on the degree to which certain cells or objects are at risk of having an abnormal condition such as malignancy or pre-malignancy. For example, a processor may evaluate objects for their nuclear integrated or average optical density, and rank the objects in accordance with their optical density values. The objects, along with their relative ranking and coordinates, may be stored for subsequent processing, review or analysis. Further aspects of a known imaging system and methods of processing image data and OOIs are described in U.S. Publication No. 2004/0254738 A1, the contents of which are incorporated herein by reference.

In general, the use of automated screening systems has been effective, since the technician's attention is focused on those slides that are suspicious or on a limited number of more pertinent objects within each slide. Automated screening systems, however, can be improved. For example, the manner in which automated systems process artifacts can be improved in order to reduce the rate of false positive or "false abnormal" results. An artifact may be considered to be an object which has no diagnostic value. One cause of false positives is the presence of artifacts, which may be abundant in a specimen sample and be in the form of large dark objects that mimic abnormal specimens. Artifacts may outrank objects containing normal cells.

For example, compared to an abnormal nucleus, a normal nucleus usually has less DNA amount and less texture. Without the presence of artifacts in the top ranked objects, the majority of the cells in a normal slide have tightly distributed DNA amounts. However, a large number of artifacts that mimic abnormal cells outrank the majority of the normal cells, and these artifacts create false alarms in data modeling. These artifacts may prevent true cells from being ranked and properly presented in the list of cells with the "top" DNA amounts. Thus, rather than selecting cells that should be reviewed, automated systems may instead mistakenly believe that an artifact is an abnormal cell and select artifacts that outrank an abnormal nucleus. This results in a selection of a smaller number of objects that actually have cells and selection of a smaller number of abnormal objects that warrant review by a cytotechnologist, thereby potentially resulting in less accurate and inaccurate analyses and diagnosis.

The occurrence of false positives sometimes results from the limited capabilities or configuration of an automated imager. That is, automated imagers may be limited by the specimen and data provided to them and by their programming. For example, for computational reasons, imagers typically use monochromatic, black and white images for their analyses. Examples of known monochromatic systems are available from Becton Dickinson Company, 1 Becton Drive, Franklin Lakes, N.J. and Cytyc Corporation, 250 Campus Drive, Marlborough, Mass. A specimen, however, may provide a great range of spectral data and other information that can be used to characterize or classify the sample. However, this other data is not available when using a monochromatic imaging and analysis system.

SUMMARY

One embodiment is directed to a method for classifying a biological specimen on a specimen carrier to determine whether the specimen requires further analysis. The method includes acquiring images of objects in the specimen and identifying objects of interest in the images. The method also includes acquiring additional images of the identified objects of interest at a plurality of different wavelengths, extracting cellular features of the identified objects of interest from the additional images and classifying the specimen according to a probabilistic model based on the extracted cellular features to determine whether the specimen requires further analysis.

Another embodiment is directed to a method for automatically classifying a biological specimen carried on a specimen carrier to determine whether the specimen requires further analysis. The method includes acquiring images of objects in the specimen and identifying objects of interest from the acquired images. The method also includes acquiring additional images of the identified objects of interest at a plurality of different wavelengths, extracting nucleus-related features of the identified objects of interest from the additional images and classifying the specimen according to a probabilistic model based on the extracted nucleus-related features. The probabilistic model includes first and second probability functions. The first probability function indicates a probability that an identified object of interest is an artifact, and the second probability function is based in part on a result of the first probability function. A combination of the first and second probability functions is used to classify the specimen and to determine whether the specimen requires further analysis.

A further embodiment is directed to a method of processing biological specimens utilizing light at multiple wavelengths and includes acquiring images of objects in the biological specimens and identifying objects of interest in the acquired images. The method also includes acquiring additional images of the identified objects of interest at a plurality of different wavelengths and extracting cellular features of the identified objects of interest from the additional images.

Yet another embodiment is directed to a method of classifying biological specimens utilizing light at multiple wavelengths and includes acquiring images of objects in the biological specimens and identifying objects of interest in the acquired images. The method also includes acquiring additional images of objects of interest of the biological specimen at a plurality of different wavelengths, extracting cellular features of the objects of interest from acquired images and classifying the biological specimen based on the extracted cellular features.

An additional embodiment is directed to a method of classifying a biological specimen utilizing light at multiple wavelengths and includes acquiring images of objects of interest of the biological specimen at a plurality of different wavelengths, extracting cellular features of the objects of interest from acquired images and classifying the biological specimen based on the extracted cellular features.

According to another embodiment, a biological screening system for classifying a biological specimen carried on a specimen carrier to determine whether the biological specimen requires further analysis includes an imaging component and a processor that is operably coupled to the imaging component. The imaging component is configured to acquire digital image data of objects in the biological specimen, and the processor is configured to process and identify objects of interest from the digital image data. The imaging component is also configured to acquire additional images of the identified objects of interest at a plurality of different wavelengths. The processor is further configured to extract cellular features of the identified objects of interest from the additional images, and to classify the biological specimen according to a probabilistic model based on extracted cellular features carriers to determine whether the biological specimen requires further analysis.

In accordance with a further embodiment, a biological screening system for classifying biological specimens carried on specimen carriers to determine whether a biological specimen requires further analysis includes an imaging component and a processor operably coupled to the imaging component. The imaging component is configured to acquire images of objects in the biological specimen, and the processor is configured to process and identify objects of interest from the acquired images. The imaging component is further configured to obtain additional images of the identified objects of interest at a plurality of different wavelengths. The processor is further configured to extract nucleus-related features of identified objects of interest from the additional images acquired at different wavelengths, and to classify the biological specimen according to a probabilistic model that is based on measured cellular features. The probabilistic model includes first and second probability functions. The first probability function indicates a probability that a selected object is an artifact, and the second probability function is based in part on a result of the first probability function. The combination of the first and second probability functions is used to classify the biological specimen and determine whether the biological specimen requires further analysis.

A further alternative embodiment is directed to a biological specimen classification system that includes an imaging component and a processor operably coupled to the imaging component. The imaging component is configured to acquire images of objects of interest of a biological specimen at a plurality of different wavelengths, and the processor configured to extract cellular-related features from the acquired images and classify the biological specimen based on the extracted cellular-related features.

In one or more embodiments, cellular features that are extracted or measured are nucleus-related features, e.g., a standard deviation of an optical density within the nucleus, a variation of an optical density within the nucleus, a corrected optical density of the nucleus, and a shape of a boundary of the nucleus.

In one or more embodiments, the probabilistic model used for classification includes two probability functions, e.g., posterior probability functions. One probability function indicates an average probability that an identified object of interest of a biological specimen is an artifact, and the other probability function is based in part on a result of the first probability function. Both probability functions may be based on different numbers and types of extracted nucleus-related features. For example, the first probability function may be based on one or more or all of a texture of a nucleus, a standard deviation of an optical density within the nucleus, a variation of an optical density within the nucleus, a corrected optical density of the nucleus, and a shape of a boundary of the nucleus, and the second probability function may be based on the result of the first probability function and one or more of an average of gray value contrast of pixels of images of nuclei of cells of identified objects of interest, and a range of gray value contrast of pixels of images of nuclei of cells of identified objects of interest. The results of the first and second probability functions can be plotted or represented in a graphical format to classify biological specimens to determine whether a specimen requires further review or which specimens of a group of specimens require further review.

BRIEF DESCRIPTION OF THE DRAWINGS

Referring now to the drawings in which like reference numbers represent corresponding parts throughout and in which:

FIG. 13 is a table illustrating objects identified during the test reflected in FIG. 12;

DETAILED DESCRIPTION OF ILLUSTRATED EMBODIMENTS

Figure 1:
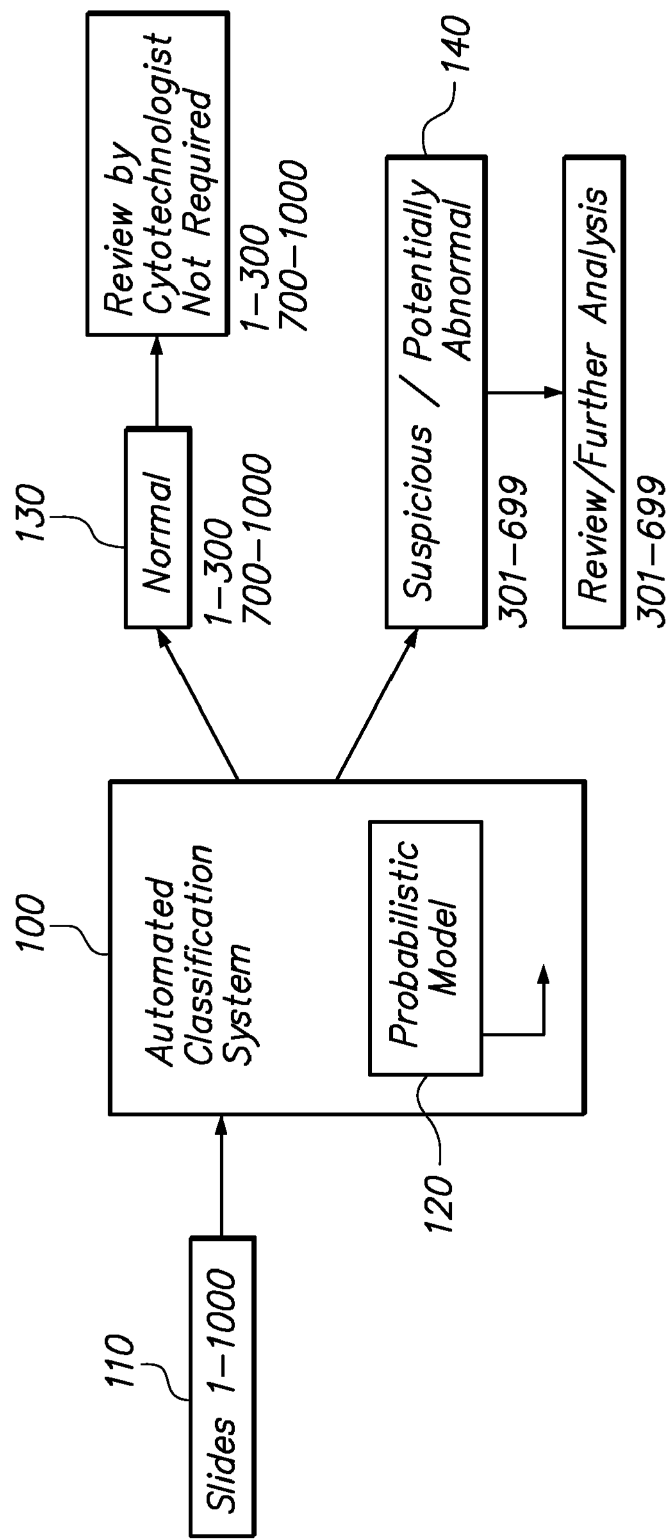
FIG. 1 is a block diagram of a system for classifying biological specimen slides and determining whether the slides should be analyzed or reviewed according to one embodiment.
Figures 2, 3:
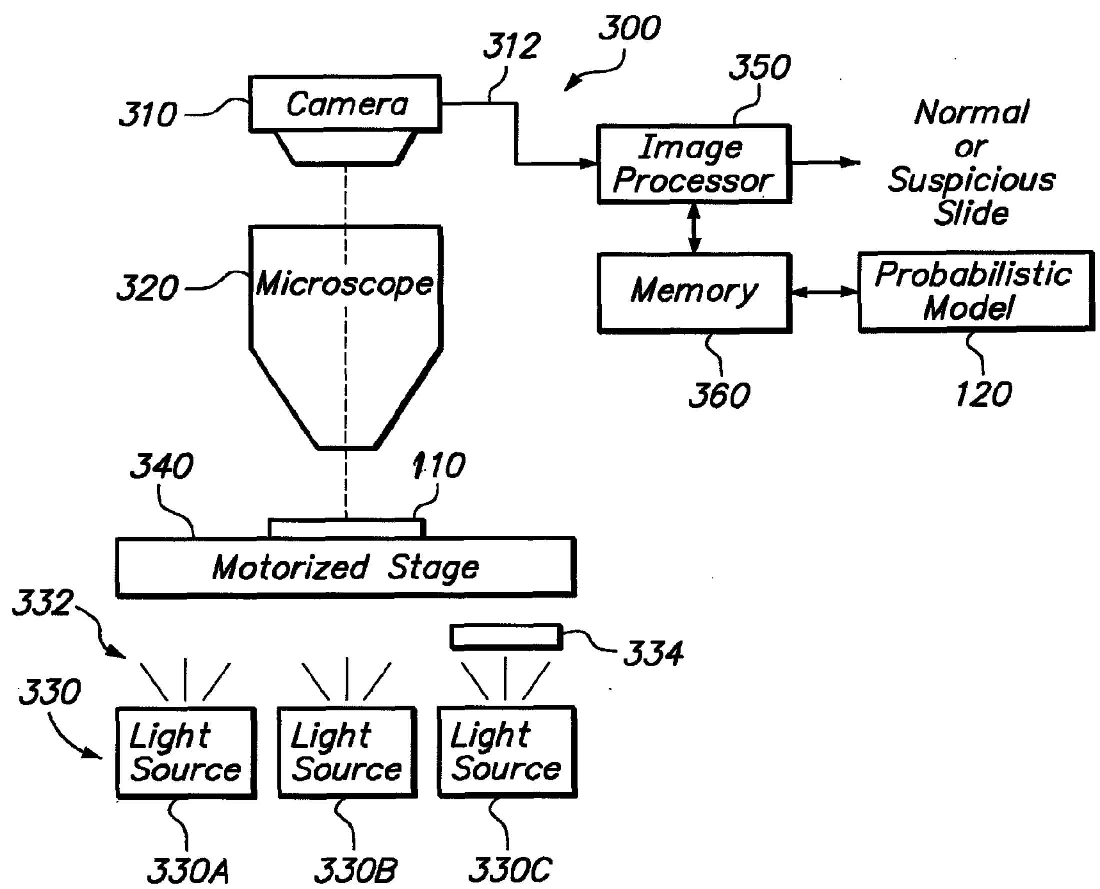
FIG. 2 is a plan view of a biological specimen slide.
FIG. 3 is a block diagram of a system for classifying biological specimen slides using multiple wavelengths of light and according to a probabilistic model according to one embodiment.

Referring to FIGS. 1 and 2, multi-wavelength biological specimen screening systems 100 and methods according to embodiments acquire images of biological specimens (e.g. cytological specimens) 112 carried by slides 110 or other suitable carriers, identify objects, e.g., Objects Of Interest (OOI), and then acquire images of selected objects or OOIs (generally referred to as "OOIs") at a plurality of different wavelengths. Data relating to cellular features, e.g. nucleus-related features of cells of OOIs, are determined, extracted or measured from the multi-spectral images. For ease of explanation, reference is made to extracting features of cells of OOIs. This data may be used for classification purposes and other applications.

According to one embodiment, the screening system 100 is configured or programmed to classify biological specimens 112 as "normal" or "suspicious" according to a probabilistic model 120, which utilizes nucleus feature data extracted from images of OOIs acquired at multiple wavelengths. For example, as shown in FIG. 1, if there are 1,000 biological specimen slides 110 to be processed, embodiments of a specimen classification system 100 can automatically classify the slides 110 using multiple wavelengths and according to a probabilistic model 120 so that certain slides, e.g., slides 1-300 and 700-1000, are classified as normal slides 130, and other slides, e.g., slides 301-699, are classified as suspicious slides 140. Of course, the number and grouping of normal and suspicious slides 130, 140 are provided for purposes of explanation. Thus, in the context of FIG. 1, a "normal" 130 specimen or slide is a specimen 112 or slide 110 that does not require further review or analysis by a cytotechnologist. In general, slides 110 are classified as normal 130 if they have non-cancerous or non pre-cancerous specimens 112. A "suspicious" 140 specimen or slide is potentially abnormal or abnormal and may include cancerous or pre-cancerous cells.

A classification as "normal" 130 or "suspicious" 140 is shown in FIG. 1 as a final determination or result of embodiments, i.e., whether or not a specimen 112 or slide 110 requires further analysis or review. A cytotechnologist can then focus his or her attention on the suspicious slides 140 rather than the normal slides 130. In this manner, valuable information regarding a specimen the slide 110 is obtained using multiple wavelengths, and this information is used to classify specimens 112 while reducing the frequency of false positives due to artifacts, thereby resulting in more accurate and efficient classification and selection of slides 110 for further review.

According to one embodiment, multi-wavelength biological screening systems 100 are configured to process a series of microscope slides 110 having biological or cytological specimens 112 such as cytological cervical or vaginal specimens (as typically found on a Pap smear slide). In this case, cells may reflect abnormalities, malignancy or premalignancy, such as Low Grade Squamous Intraepithelial Lesions (LGSIL) or High Grade Squamous Intraepithelial Lesions (HGSIL), as well as all other cytological categories (e,g, infection, cytolysis). The specimen 112 will typically be placed on the slide 110 as a thin cytological layer. Preferably, a cover slip (not shown) is adhered to the specimen 112, thereby fixing the specimen 112 in position on the slide 110. The specimen 112 may be stained with any suitable stain, such as a ThinPrep® Nuclear Stain.

Embodiments can also be used to characterize or classify other types of biological specimens 112 including blood, urine, semen, milk, sputum, mucus, plueral fluid, pelvic fluid, synovial fluid, ascites fluid, body cavity washes, eye brushing, skin scrapings, a buccal swab, a vaginal swab, a pap smear, a rectal swab, an aspirate, a needle biopsy, a section of tissue obtained for example by surgery or autopsy, plasma, serum, spinal fluid, lymph fluid, the external secretions of the skin, respiratory, intestinal, and genitourinary tracts, tears, saliva, tumors, organs, a microbial culture, a virus, and samples of in vitro cell culture constituents as "normal" 130 or "suspicious" 140 using multiple wavelengths. This specification refers to cytological cervical or vaginal specimens 112 (as on a Pap smear slide) to illustrate one manner in which embodiments can be implemented, and it should be understood that embodiments can be applied to various types of tissue and cells. Further aspects of system and method embodiments are described with reference to FIGS. 3-15.

Referring to FIG. 3, in one embodiment, a biological specimen screening system 300 for classifying or characterizing biological specimen slides 110 includes a camera or other imaging component 310, a microscope 320, a light source 330 for providing light 332 through the biological specimen slide 110 and the microscope 320 to the camera 310, a motorized stage 340, which supports the biological specimen slide 110, an image processor 350 and an associated memory or a storage device 360 (generally referred to as memory 360). The memory 360 can be a part of the image processor 350 or a separate component.

The image processor 350 and/or the memory 360 can store or have access to the probabilistic model 120, which is used to classify biological specimens 112 as "normal" 130 or "suspicious" 140. The probabilistic model 120 may be in the form of hardware, software or a combination thereof. For example, the probabilistic model 120 can be in the form of a series of programmed instructions and/or data stored in memory 360 and executed by the image processor 350 in conjunction with specimen data acquired by the image processor 350. The probabilistic model 120 may also be executed or a part of a separate processor or controller.

The camera 310 can be one of various known digital cameras, and the light source 330 can include a single light source or multiple individual light sources, as shown in FIG. 3. FIG. 3 shows three light sources 330*a-c* (generally referred to as light source 330), to generally illustrate that a system 300 can include a plurality of light sources 330. It should be understood that various numbers of light sources 330 can be used as needed in order to achieve desired multi-wavelength analysis of OOIs as discussed in further detail below, and that FIG. 3 is provided to generally illustrate that a system 300 may include multiple light sources 330.

According to one embodiment, a screening and classification system 300 includes multiple light sources 330, each of which emits light 332 at a different wavelength. Suitable light sources 330 for this purpose may be Light Emitting Diodes (LEDs). In other embodiments, a light source 330 may be paired with one or more other optical components such as one or more prisms (not shown) and/or one or more optical filters 334 so that light 332 transmitted through the filter 334 has a desired wavelength or range of wavelengths. Examples of filters that may be utilized with embodiments include dichroic filters, interference filters, filter wheels. The filter 334 can be adjusted or selected to alter the wavelength of light 332 that is provided to the microscope 320 and the camera 310 for imaging portions of the specimen 112. Liquid crystal tunable filters may also be utilized. Further aspects of suitable system 300 components are described in US 2004/0253616 A1, the contents of which are incorporated herein by reference.

Figure 4:
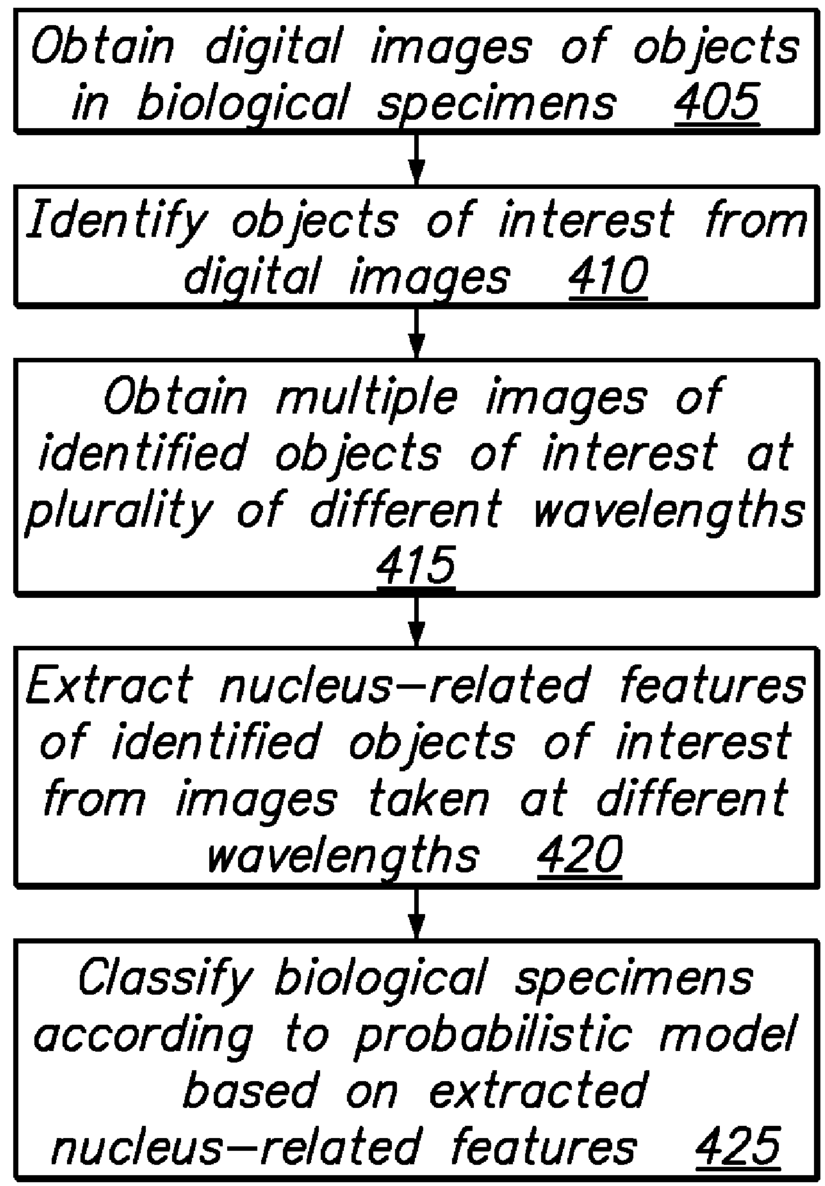
FIG. 4 is a flow chart of a method for classifying biological specimen slides using multiple wavelengths of light and according to a probabilistic model according to one embodiment.

Referring to FIG. 4, in a method 400 according to one embodiment, light 332 is directed from the light source 330, through the stage 340 and microscope 320, and to the camera 310, which obtains digital images of the biological specimens 112 at stage 405. More particularly, the slide 110 having a cytological specimen 112 is mounted on the motorized stage 340, which moves or scans the slide 110 relative to the viewing region of the microscope 320, while the camera 310 captures images over the entire biological specimen 112 or portions thereof with light 332 emitted by the light source 330. For example, each pixel of each image acquired by the camera 310 can be converted into an eight-bit value (0 to 255) depending on its optical transmittance, with "00000000" being the assigned value for least amount of light passing through the pixel, and "11111111" being the assigned value for a greatest amount of light passing through the pixel. The shutter speed of the camera 310 is preferably relatively high, so that the scanning speed and/or number of images taken can be maximized. The biological specimens 112 carried by slides 110 may be contained within a cassette (not shown), in which case slides 110 are removed from the respective cassettes, digitally imaged, and then returned to the cassettes in a serial fashion.

At stage 410, the acquired images or image data are provided to the image processor 350, which executes a variety of operations on the images or image data 312 in order to identify the most pertinent or highest ranking objects, otherwise referred to as objects of interest (OOIs). For example, an image processor 350 may identify about 20 or 40 objects or other suitable numbers of objects that appear to be the most relevant. For this purpose, the image processor 350 may perform primary and secondary segmentation as described in US 2004/0253616, the contents of which were previously incorporated herein by reference, and measure, determine or extract various features for each of the individual objects and clustered objects, and then calculate an object score for each object based on the measured values of these features. Based on this score, the image processor 350 can identify or select objects and clustered objects that are considered objects of interest (OOIs), the locations of which may be stored in memory for future reference.

Figure 5:
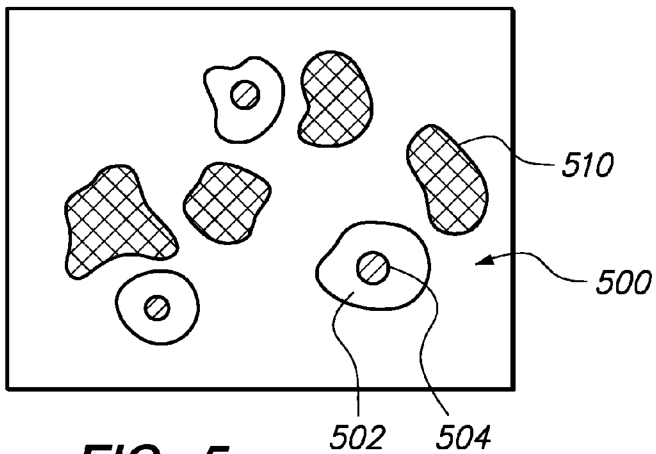
FIG. 5 generally illustrates a portion of an object of a biological specimen including cells and artifacts.

Referring to FIG. 5, although the image processor 350 attempts to identify OOIs (a portion or which is shown in FIG. 5) containing cells 500 including cytoplasm 502 and a nucleus 504, the selected OOIs may instead be artifacts 510. Selection of artifacts 510 may result in exclusion of other cell-containing objects that should be identified as an OOI and analyzed. Embodiments advantageously determine how likely an OOI is an artifact 510 for purposes of classifying a specimen 112 as a normal 130 or suspicious 140. Embodiments use this information to improve review of biological specimens 112 and may replace artifacts 510 with cell-containing objects, e.g., with the next highest ranked object that includes cells 500 and that is not an artifact.

More specifically, referring again to FIG. 4, at stage 415, having imaged and identified a plurality of OOIs form initial specimen images, the system 300 proceeds to acquire additional images of the OOIs at a plurality of different wavelengths using separate light sources 300, or one or more filters 334 as discussed above with reference to FIG. 3. According to one embodiment, each OOI can be imaged at about 3 to about 30 different wavelengths, e.g., 19 different wavelengths. According to one embodiment, the range of wavelengths used for imaging the OOIs may be about 410 nm to about 720 nm, e.g., about 440 nm to about 720 nm. At stage 420, the image processor 350 executes a variety of operations on the multi-wavelength digital images of the OOIs to measure, determine or extract various nucleus-related features from the multi-wavelength OOI images. Further details regarding acquiring additional images of OOIs at different wavelengths and extracting features from these images are provided in U.S. Publication No. 2006/0245630 A1, the contents of which are incorporated herein by reference. At stage 425, the biological specimens 112 are classified or characterized as normal 130 or suspicious 140 according to the probabilistic model 120 that utilizes nucleus-related features extracted from the multi-wavelength OOI images.

Figure 6:
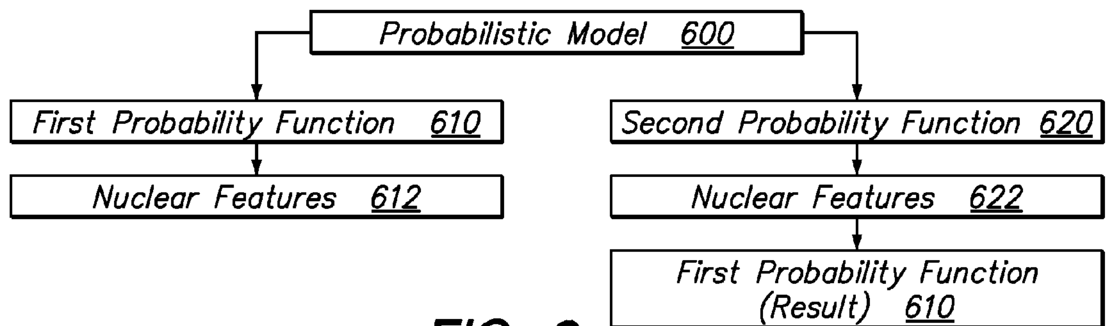
FIG. 6 illustrates a probabilistic model that includes a plurality of probability functions for use in various embodiments.

Referring to FIG. 6, according to one embodiment, biological specimens 112 are classified or characterized according to a probabilistic model 600 that utilizes multiple probability functions (e.g., multiple posterior probability functions). According to one embodiment, the probabilistic model 600 may be used to indicate how likely an OOI is an artifact 510 and also how likely a biological specimen 112 is normal 130. The combination of this data is then used to classify the specimen 112 is normal 130 or suspicious 140.

In the embodiment illustrated in FIG. 6, the probabilistic model 600 includes two different probability functions 610 and 620, which may, according to one embodiment, be posterior probability functions. Both of the probability functions 610, 620 utilize nucleus-related features 612, 622. According to one embodiment, as generally illustrated in FIG. 6, the probability functions 610, 620 utilize different nucleus-related features 612, 622.

Figure 7:
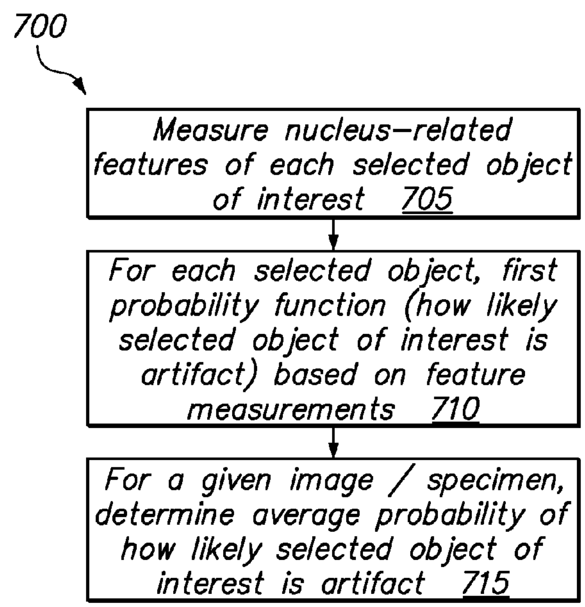
FIG. 7 is a flow chart generally illustrating a first probability function for use in various embodiments for determining a probability that an object is an artifact.
Figure 8:
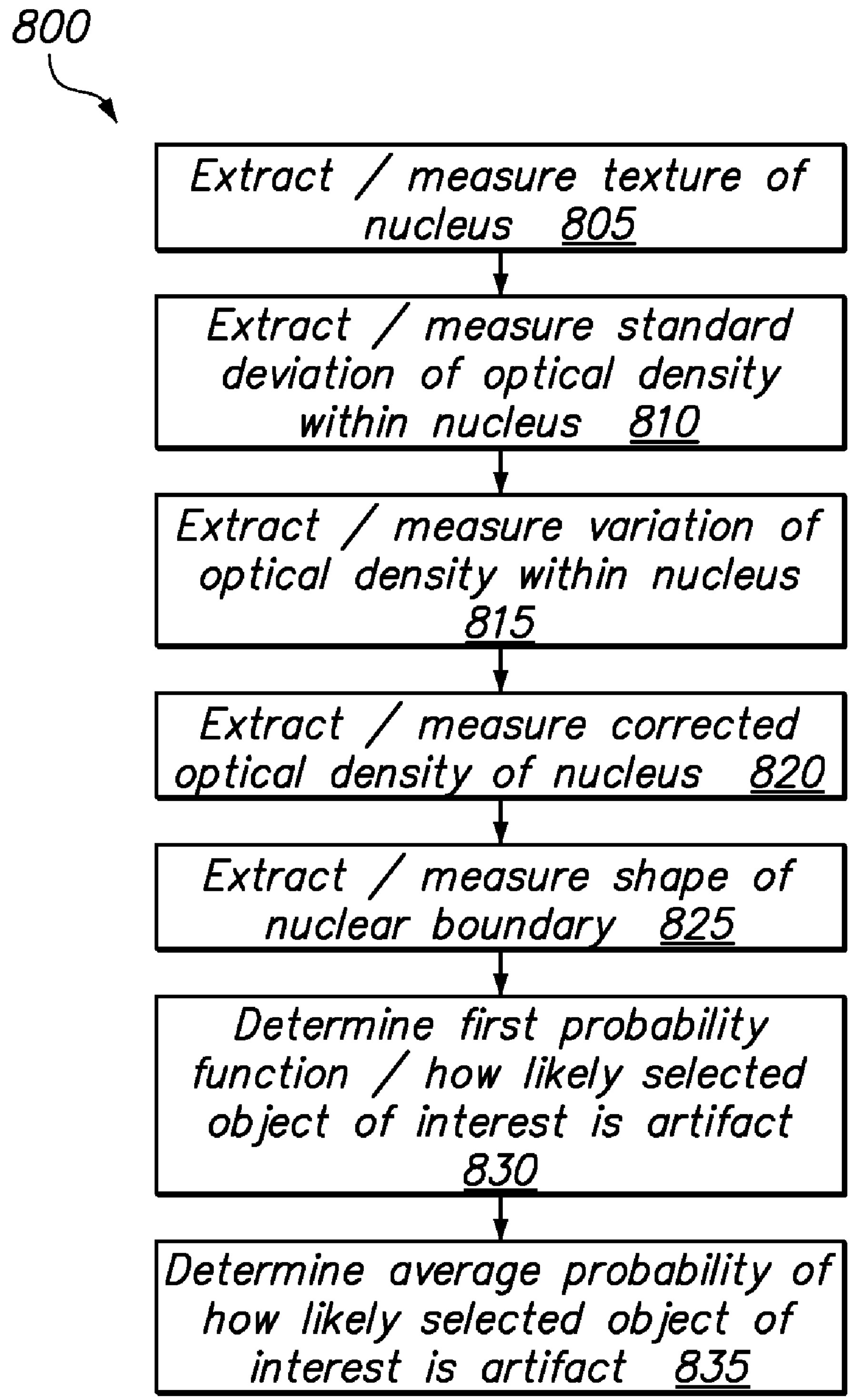
FIG. 8 is a flow chart of a first probability function according to another embodiment.

In the illustrated embodiment, the second probability function 620 uses nucleus-related features 622 and the results of the first probability function 610. In other words, the first probability function 610 is based on nucleus-related features 612 and is independent of the second probability function 620, whereas the second probability function 620 utilizes nucleus-related features 622 and the first probability function 610. FIGS. 7 and 8 further illustrate a first probability function 610 according to embodiments, and FIGS. 9 and 10 further illustrate a second probability function 620 according to embodiments.

Referring to FIG. 7, according to one embodiment, a method 700 of classifying or characterizing biological specimens 112 using a probabilistic model involves a first probability function 610 that is used to determine a probability or likelihood that a selected OOI is an artifact 510 rather than a cell 500. By determining probabilities of how likely top ranked objects or OOIs are artifacts 510 rather than cells 500, the percentage of the occurrence of artifacts 510 among top ranked objects can be determined.

A method 700 according to one embodiment includes extracting or measuring nucleus-related features 612 of each OOI using images of OOIs obtained at a plurality of different wavelengths. Measurements of nucleus-related features extracted from multi-wavelength images provide more in depth information about cells in the OOIs compared to features extracted from a single gray level or monochromatic image. In one embodiment, this involves measuring or determining nucleus-related features 612 involving, for example, texture, optical density and a shape of a nucleus based on the images of the OOIs taken at multiple wavelengths. Texture refers to the value of a given pixel in comparison with neighboring pixels. Optical density is a measurement of optical absorbance. The variation of the optical density in the multi-wavelength images, for example, provides significant information for use in determining how likely an OOI is an artifact 510. Shape refers to the irregularity of the outline of the nucleus. There may also be cases when certain features may be extracted from single-wavelength images, and other features may be extracted from multi-wavelength images. For example, a feature of texture can be extracted from a single wavelength image (e.g., at about 570 nm), and the feature of optical density may be extracted from a multi-wavelength image (e.g., at about 520 nm and 630 nm).

At stage 710, the extracted feature measurements 612 are used to determine a probability that an OOI is an artifact 510. This is performed for each OOI. Thus, the result of stage 710 is a collection of probability values, each OOI being associated with a particular probability value (e.g., a fraction or a percentage). Then, at stage 715, an average probability is determined by calculating the average of the probability values that were obtained during stage 710. For example, if the probability that a first OOI is an artifact 510 is 0.4, the probability that a second OOI is an artifact 510 is 0.8, and the probability that a third OOI is an artifact 510 is 0.5, then the Average Probability that the OOI (or other object) is an Artifact (otherwise referred to as the "APA") would be (0.8+0.4+0.5)/3, or approximately 0.57. The result of stage 715 is an average probability that an OOI for a given specimen 112 consists of more artifacts 510 than true cells 500.

Referring to FIG. 8, according to one embodiment, a method 800 for determining APA includes measuring a plurality of nucleus-related features 612 of each OOI. In one embodiment, this involves measuring or determining nucleus-related features 612 involving texture, optical density and a shape of a nucleus based on the images of the OOIs taken at multiple wavelengths. For example, in one embodiment, this involves measuring, determining or extracting a texture of the nucleus of each OOI at stage 805, measuring, determining or extracting a standard deviation of the optical density within the nucleus at stage 810, measuring, determining or extracting a variation of the optical density within the nucleus at stage 815, measuring, determining or extracting a corrected optical density of the nucleus at stage 820, and measuring, determining or extracting a shape of the boundary of the nucleus at stage 825. Having this data, at stage 830, a first probability, e.g., a first posterior probability, of how likely a selected OOI is an artifact 510 is calculated. At stage 835, the average probability of how likely a selected OOI is an artifact 510 is determined based on the individual probability values determined at stage 825.

In the illustrated embodiment, the method 800 involves five nucleus-related features 612. In other embodiments, the method 800 may include different numbers of nucleus-related features 612, e.g., less than five nucleus-related features 612, or more than five nucleus-related features 612. Further, different nucleus-related features 612 other than the five nucleus-related features recited in stages 805-825 can also be utilized. Thus, FIG. 8 is provided to illustrate one example of a first probability function 610.

Figure 9:
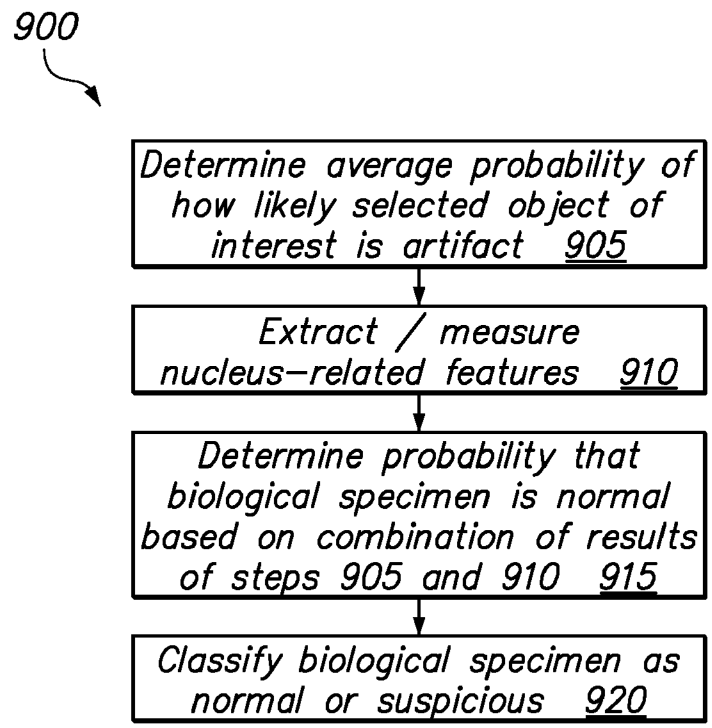
FIG. 9 is a flow chart generally illustrating a second probability function for use in various embodiments for determining a probability that a biological specimen is normal.

Referring to FIG. 9, a method 900 of determining how likely a biological specimen 112 is normal 130 includes determining the average probability of how likely a selected OOI is an artifact 150 (e.g., using the APA as discussed with reference to FIGS. 7 and 8) at stage 905, and then determining nucleus-related features 622 at stage 910. At stage 915, a probability that a biological specimen 112 is normal 130 is determined based on the combination of the average probability (stage 905) and measured nucleus-related features (stage 910). At stage 920, the combination of the data generated by the first and second probability functions is then used to classify a biological specimen 112 as normal 130 or suspicious 140.

Figure 10:
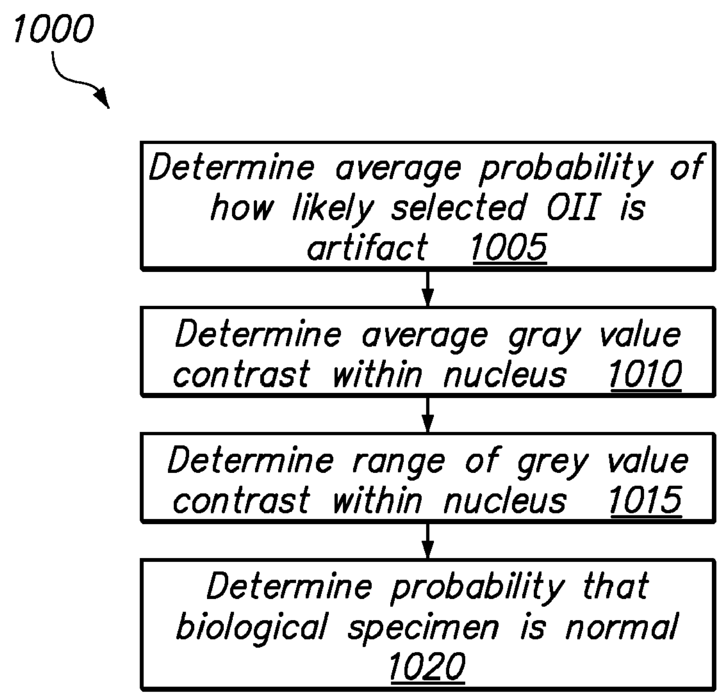
FIG. 10 is a flow chart of a second probability function according to another embodiment.

FIG. 10 illustrates one embodiment of a method 1000 for determining how likely a biological specimen 112 is normal 130 and includes, at stage 1005, determining the APA or the average probability of how likely a selected OOI is an artifact 510, and determining nucleus-related features 622 relating to gray values of pixels of images of a nucleus. This may involve determining an average gray value contrast within the nucleus at stage 1010, and determining a range of gray value contrast within the nucleus at stage 1015. Having this data, at stage 1020, a probability that the biological specimen 112 is normal 130 is determined based on the first probability function 610 (the APA) and the determined gray value contrast data (stages 1010 and 1015). The combination of the data generated by the first and second probability functions is then used to classify a biological specimen 112 as normal 130 or suspicious 140.

Figure 11:
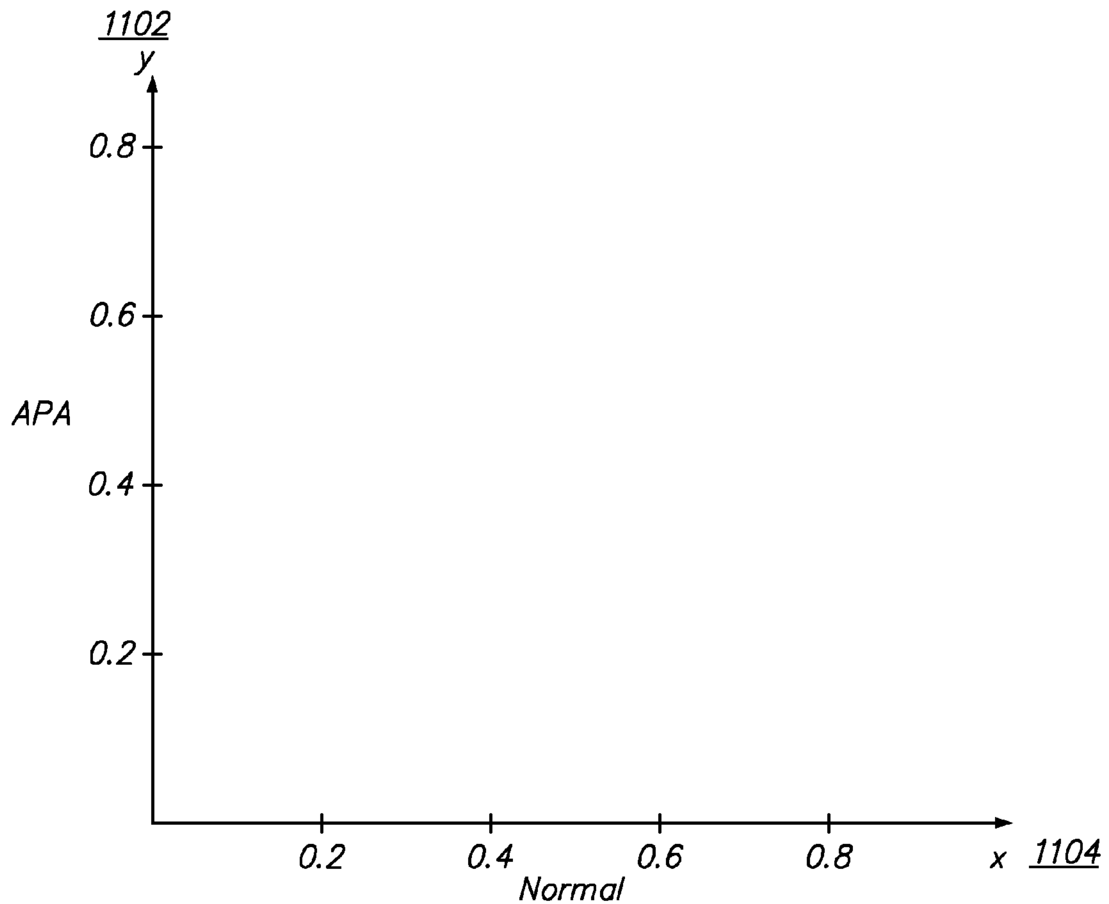
FIG. 11 generally illustrates how data generated by first and second probability functions can be plotted in a graph.

Referring to FIG. 11, data generated by the first probability function 610 and data generated by the second probability function 620 can be plotted in a suitable graph 1100 for purposes of classifying a specimen 112 as normal 130 or suspicious 140. In the illustrated embodiment, the graph 1100 is a two-dimensional graph including x and y axes. The y-axis 1102 that represents the first probability function 610, i.e., an average probability that an object is an artifact or the "APA". The x-axis 1104 of the graph 1100 represents the second probability function 620, i.e., how likely a biological specimen is a normal 130 specimen. Accordingly, the values of the x and y axes 1102 and 1104 are represented as decimals or percentage values (e.g., 20%, 60%). Thus, the first probability function 610 involves confirming that a borderline normal 130 specimen or slide is most likely caused by artifacts, and the second probability function 620 is used to confirm that the borderline normal 130 cases (with high artifact counts) can be classified as normal 130 and sorted out safely such that they do not require further review or analysis.

Figure 12:
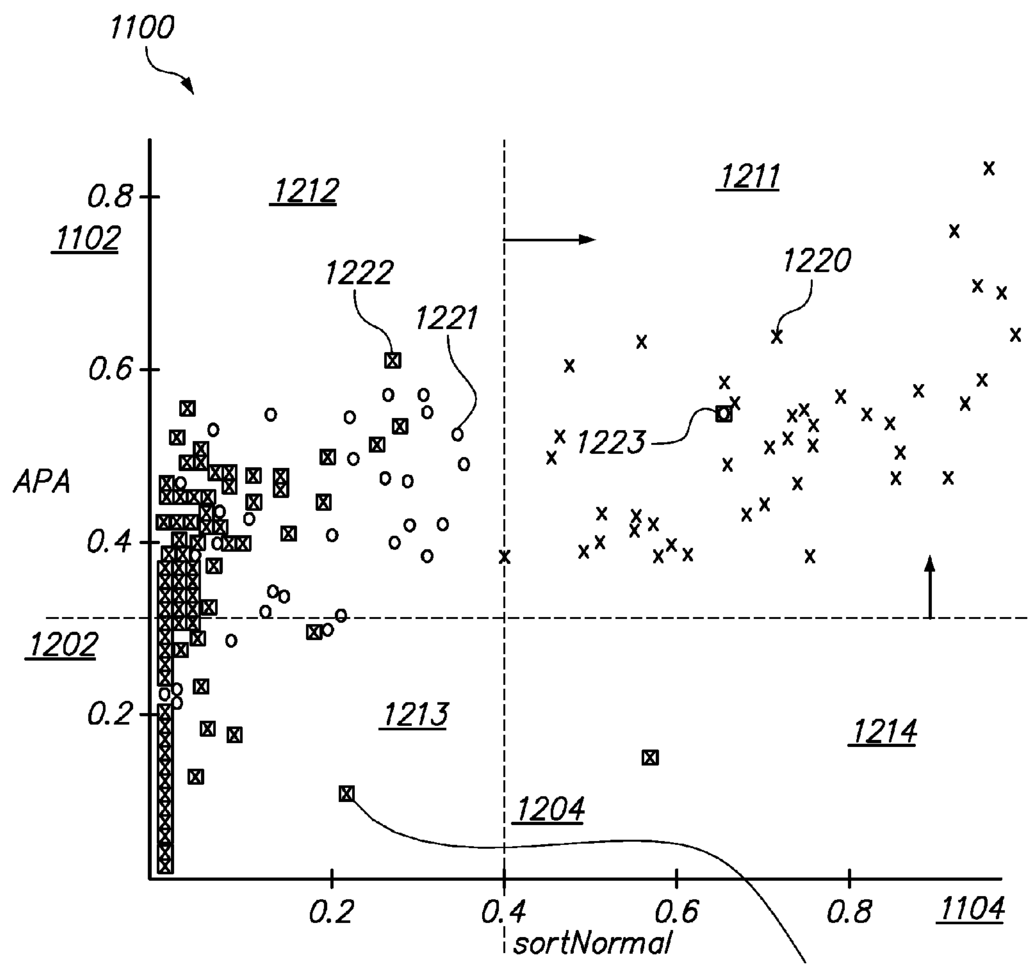
FIG. 12 illustrates test data points representing normal and abnormal slides plotted with the graph shown in FIG. 11.

FIG. 12 illustrates the graph 1100 shown in FIG. 11 populated with data that was generated during a test conducted using first and second probability functions 610, 620 that were plotted against each other. Each test data point in FIG. 12 represents a slide 110 having a biological specimen 112. Data points were generated by identifying OOIs. The different types of OOIs that were identified are summarized in a chart 1300 in FIG. 13. The first column 1301 of the chart identifies the type of object, and the second column 1302 indicates the number of objects of the particular type, including different types of artifacts 510 that were identified as objects (identified by grouping 1310).

For this particular test, images of the OOIs were acquired at 19 different wavelengths ranging from about 440-720 nm. Ten different nucleus-related features were then analyzed using the multi-wavelength images, resulting in 190 different nucleus-related features. Nucleus-related features 612 including shape, optical density and texture were utilized with the first probability function 610, and nucleus-related features 622 including shape, optical density and texture were utilized with the second probability function 620.

The selection of features can be based on different criteria. In this particular example, selection of features was based on correlating feature values to pre-assigned groups using, e.g., Pearson Product-Moment correlations. The pre-assigned groups in this example are "cell" and "artifact" and covariance matrices are computed for cells and artifacts versus their selected features. Mahalanobis distances among the test objects from the group mean are calculated, and a test object belongs to the category when its distance from the group mean is a minimum. The posterior probability of how likely each object belongs to the "artifact" category is used for calculating the first probability function, or the Average Probability that an object is an "Artifact" ("APA").

The resulting data points representing individual slides 110 are plotted in the graph 1100 as shown in FIG. 12. The graph 1100 is divided into four quadrants 1211, 1212, 1213, 1214 by lines 1201, 1204. The horizontal line 1202 is defined by a first probability function 610 value, and the vertical line 1204 is defined by a second probability function 620 value. The graph 1100 includes data points representing 299 specimen slides 110. Normal slides or specimens 130 that were correctly classified as normal 130 are represented by "X" 1220, normal slides or specimens 130 that were not classified as normal 130 but instead were classified as suspicious 140 are represented by "circle" 1221, abnormal or suspicious slides or specimens 140 that were instead classified as normal 130 are represented by "enclosed X" 1222, and abnormal or suspicious slides or specimens 140 that were instead classified as normal 130 are represented by "enclosed circle" (1223). Thus, based on embodiments, in the illustrated example, specimens corresponding to data points 1220 would be reviewed by a cytotechnologist, whereas specimens corresponding to data points 1221, 1222 and 1223 would not be reviewed by a cytotechnologist.

More specifically, of the 299 specimen slides 100, 225 slides contained specimens that were suspicious or abnormal 140, and the remaining 74 slides contained specimens that were normal 130. Embodiments were tested to determine how many of the 74 normal 130 specimen slides could be correctly classified as normal 130 based on the first and second probability functions 610, 620.

More particularly, specimen slides 110 having sufficiently high x axis 1104 values can be classified as normal 130 since the x axis 1104 represents a probability that the specimen 112 is normal 130 as determined using the second probability function 620. Similarly, slides 110 having a sufficiently high y axis value 1102 can also be classified as normal 130 since artifacts 510 often mimic abnormal cells but are not abnormal cells and, therefore, can be classified as normal 130. Thus, with embodiments, slides 110 can be advantageously be classified as normal 130 based on the corresponding data points having a sufficiently high x-axis 1104 or first probability function (APA) values along the x-axis 1104, and sufficiently high second probability function (probability that normal) values along the y-axis 1102 such that the corresponding data points are within the upper right quadrant 1211.

In the illustrated embodiment, slides 110 that are most likely normal 130 are those slides having a first probability function 610 or APA value that is greater than a first value 1202, e.g., greater than about 0.3, and a second probability function 620 value that is greater than a second value 1204, e.g., greater than about 0.4. Specimen slides 110 corresponding to these data points in the upper right quadrant 1211 defined by the intersection of lines extending through the x and y axes at these points 1202, 1204 can be used to classify the corresponding slides as normal 130 (identified by "X" 1220). Thus, it is not necessary for a cytotechnologist to review or analyze slides corresponding to data points 1220 ("X") and embodiments advantageously eliminate these slides from further review.

In the illustrated example, 37 of 74 normal 130 slides were correctly classified as normal 130 (identified by "X" 1220). Most of the remaining 37 normal 130 slides (identified by "circle" 1221) were not initially classified as normal 130 and were classified as suspicious 140 due to lower x-axis 1104 values or lower second probability function 620 values such that the corresponding data points fell within the upper left quadrant 1212. Slides corresponding to data points 1221 (circle) are classified as suspicious 140 and, therefore, would be identified for further review and analysis by a cytotechnologist. Thus, embodiments advantageously eliminated about 50% of the normal 130 slides (identified by "X" 1220) and about 12% of all slides 110 from the pool of slides that could be considered by a cytotechnologist.

In the illustrated example, there was one abnormal specimen (identified by "enclosed circle" 1223) that was incorrectly classified as normal 130 in the upper right quadrant 1211. As a result, this abnormal specimen 1223 would not be examined by a cytotechnologist since it was classified as normal 130. However, of the approximately 47 slides identified as normal 130, only one abnormal slide (identified by enclosed "circle" 1223) was incorrectly classified as normal 130. This low error rate is believed to be better than error rates achieved during manual review by a cytotechnologist. Thus, although there may be cases in which a small number of abnormal 140 slides are classified as normal 130 when they should be classified as suspicious 140, it is believed that the error rate will be satisfactorily low and such errors will present an acceptable trade-off for the capability of identifying about 50% of the normal 130 slides to ease the burden on the cytotechnologist and focus the cytotechnologist's attention on more pertinent suspicious or abnormal slides 140.

Data points in the remaining three quadrants (upper left 1212, lower left 1213 and lower right 1214 quadrants) represent normal 130 specimens that were not initially classified as normal (identified by "circle" 1221) and abnormal specimens 140 that were correctly classified as "abnormal" or "not normal" (identified by enclosed "X" 1222). The imaging processor 350 can process this data to generate indications concerning whether a particular slide 110 should be reviewed by a cytotechnologist or identify which slides 110 require cytotechnologist review (e.g., by generating a list of slides 110 that should be reviewed since they do not occupy the upper right quadrant 1211 and were not initially classified as normal 130 using the first and second probability functions 610, 620).

Although particular embodiments have been shown and described, it should be understood that the above discussion is not intended to limit the scope of these embodiments. Various changes and modifications may be made without departing from the scope of the claims.

Figure 14:
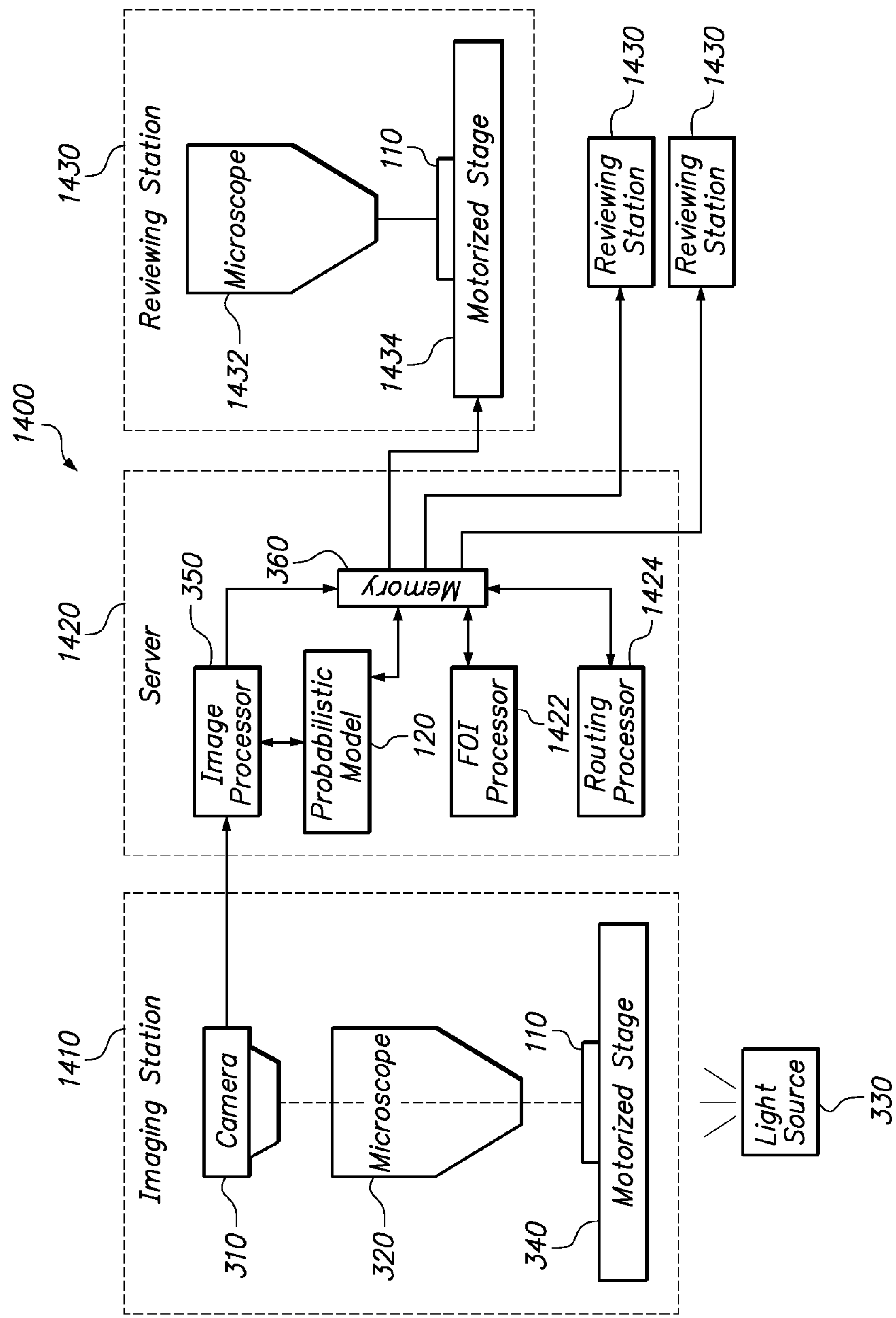
FIG. 14 illustrates an alternative biological specimen analysis system in which embodiments can be implemented and that includes an imaging station, a server and a reviewing station.
Figure 15:
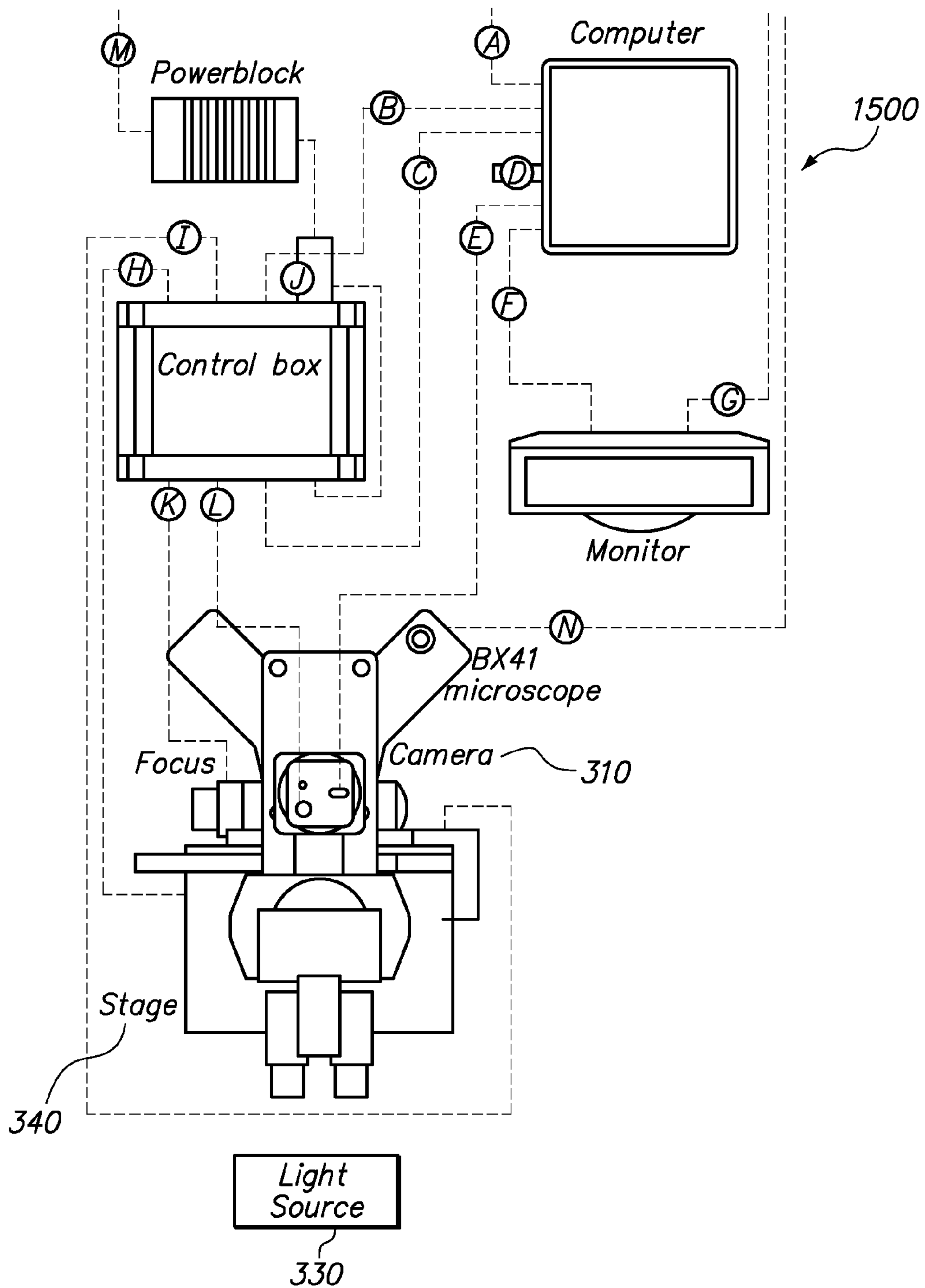
FIG. 15 illustrates an alternative biological specimen analysis system in which embodiments can be implemented and that includes integrated imaging and review capabilities.

For example, although embodiments are described with reference to an example of an imaging system shown in FIG. 3, other imaging system configurations can be used, and an imaging system in which embodiments are implemented can be used or be associated with or connected to other system components, as generally illustrated in FIG. 3. For example, referring to FIG. 14, another system in which embodiments can be implemented includes an imager 1410 (e.g., as shown in FIG. 3 or another suitable imager), a server 1420 that includes the image processor 350, memory 360 and probabilistic model 120 and other associated components such as FOI processor 1422 and routing processor 1424, and a reviewing station 1430 that includes a separate microscope 1432 and motorized stage 1434. Further aspects of the system configuration shown in FIG. 14 are provided in U.S. Application Publication No. 2004/0253616A1, the contents of which were previously incorporated herein by reference. Further, embodiments can be implemented in a stand alone or separate imaging system, e.g., as shown in FIG. 14, or in an integrated system 1500 that include both imaging and review capabilities, such as the $I^2$ imaging/review system available from Cytyc Corporation, and generally illustrated in FIG. 15.

Additionally, embodiments can be utilized to process and analyze various types of specimens other than cytological cervical or vaginal specimens, which are provided as examples of how embodiments may be implemented. Moreover, embodiments can involve specimens held or carried by various specimen carriers including slides and vials. Further, it should be understood that embodiments can be applied for classification of different types of specimens and may be used for other purposes.

Embodiments may also involve first and second probability functions 610, 620 (e.g., posterior probability functions) that are based on data acquired from images acquired at various numbers of wavelengths and various nucleus-related features. Light at multiple wavelengths can be generated using various optical components and combinations thereof. Further, different numbers of nucleus-related features can be used for purposes of determining values using the first and second probability functions. Accordingly, a first probability function that utilizes five nucleus-related features, and a second probability function that utilizes the first probability function and two nucleus-related features are provided to illustrate examples of how embodiments can be implemented, and other embodiments can involve use of different types and numbers of nucleus-related features. Additionally, a probabilistic model can involve variations of the probabilistic models described above.

Further, embodiments can be embodied as a computer program product for use with biological specimen classification system and that embodies all or part of the functionality previously described herein. Such an implementation may comprise a series of computer readable instructions either fixed on a tangible medium, such as a computer readable medium, for example, diskette, CD-ROM, ROM, or hard disk, or transmittable to a computer system, via a modem or other interface device.

Thus, embodiments are intended to cover alternatives, modifications, and equivalents that fall within the scope of the claims.

What is claimed is:

1. A method for classifying a biological specimen on a specimen carrier to determine whether the specimen requires further analysis, the method comprising:

acquiring images of objects in the specimen;

identifying objects of interest in the images;

acquiring additional images of the identified objects of interest at a plurality of different wavelengths;

extracting cellular features of the identified objects of interest from the additional images;

using the extracted cellular features and a first probability function to determine a probability that the identified objects of interest are artifacts; and classifying the specimen according to a probabilistic model based on the first probability function to determine whether the specimen requires further analysis.

2. The method of claim 1, wherein the additional images of the identified objects of interest are acquired at more than three different wavelengths.

3. The method of claim 1, the extracted cellular features being nucleus-related features.

4. The method of claim 3, the nucleus-related features comprising a texture of the nucleus, a standard deviation of an optical density within the nucleus, a variation of an optical density within the nucleus, a corrected optical density of the nucleus, and a shape of a boundary of the nucleus.

5. The method of claim 1, the probabilistic model including the first probability function and a second probability function, results of the first and second probability functions being used to classify the specimen and determine whether the specimen requires further analysis.

6. The method of claim 5, the second probability function being based in part on a result of the first probability function.

7. The method of claim 5, the extracted cellular features being nucleus-related features, and both of the first and second probability functions being based on extracted nucleus-related features.

8. The method of claim 7, the first probability function being based on nucleus-related features, including a texture of a nucleus, a standard deviation of an optical density within a nucleus, a variation of an optical density within a nucleus, a corrected optical density of a nucleus, and a shape of a boundary of a nucleus.

9. The method of claim 7, the second probability function being based on nucleus-related features, including an average of gray value contrast of pixels of images of nuclei of cells of identified objects of interest, and a range of gray value contrast of pixels of images of nuclei of cells of identified objects of interest.

10. The method of claim 7, the first and second probability functions being based on different types and different numbers of nucleus-related features.

11. The method of claim 5, the first and second probability functions comprising first and second posterior probability functions.

12. The method of claim 5, further comprising generating a graphical representation of results of the first probability function versus results of the second probability function, the specimen being classified based on the graphical representation.

13. A method for automatically classifying a biological specimen carried on a specimen carrier to determine whether the specimen requires further analysis, the method comprising:

acquiring images of objects in the specimen;

identifying objects of interest from the acquired images;

acquiring additional images of the identified objects of interest at a plurality of different wavelengths;

extracting nucleus-related features of the identified objects of interest from the additional images; and classifying the specimen according to a probabilistic model based on the extracted nucleus-related features, the probabilistic model including a first probability function and a second probability function, the first probability function indicating a probability that an identified object of interest is an artifact, and the second probability function being based in part on a result of the first probability function, wherein the combination of the first and second probability functions is used to classify the specimen and to determine whether the specimen requires further analysis.

14. The method of claim 13, the first probability function indicating an average probability that an identified object of interest of a biological specimen is an artifact.

15. The method of claim 13, the first probability function being based on nucleus-related features including a texture of a nucleus, a standard deviation of an optical density within the nucleus, a variation of an optical density within the nucleus, a corrected optical density of the nucleus, and a shape of a boundary of the nucleus.

16. The method of claim 13, the second probability function being based on nucleus-related features including an average of gray value contrast of pixels of images of nuclei of cells of identified objects of interest, and a range of gray value contrast of pixels of images of nuclei of cells of identified objects of interest.

17. The method of claim 13, wherein the first and second probability functions are based on different types and different numbers of nucleus-related features.

18. The method of claim 13, the first and second probability functions comprising first and second posterior probability functions.

19. The method of claim 13, further comprising generating a graphical representation of results of the first probability function versus results of the second probability function, the biological specimen being classified based on the graphical representation.

20. A biological screening system for classifying a biological specimen carried on a specimen carrier to determine whether the biological specimen requires further analysis, the system comprising:

an imaging component configured to acquire digital image data of objects in the biological specimen; and a processor configured to process and identify objects of interest from the digital image data, the imaging component being further configured to acquire additional images of the identified objects of interest at a plurality of different wavelengths, the processor being further configured to extract cellular features of the identified objects of interest from the additional images, to use the extracted cellular features and a first probability function to determine a probability that the identified objects of interest are artifacts, and to classify the biological specimen according to a probabilistic model based on the first probability function to determine whether the biological specimen requires further analysis.

21. The system of claim 20, the imaging component being configured to acquire additional images of identified objects of interest at more than three different wavelengths.

22. The system of claim 20, the extracted cellular features being nucleus-related features.

23. The system of claim 20, the probabilistic model including the first probability function and a second probability function, results of the first and second probability functions being used to classify the specimen and determine whether the specimen requires further analysis.

24. The system of claim 23, the second probability function being based in part on a result of the first probability function.

25. A biological screening system for classifying biological specimens carried on specimen carriers to determine whether a biological specimen requires further analysis, the system comprising:

an imaging component configured to acquire images of objects in the biological specimen; and a processor configured to process and identify objects of interest from the acquired images, the imaging component being further configured to obtain additional images of the identified objects of interest at a plurality of different wavelengths, the processor being further configured to extract nucleus-related features of identified objects of interest from the additional images acquired at different wavelengths, and to classify the biological specimen according to a probabilistic model that is based on the extracted nucleus-related features, the probabilistic model including a first probability function and a second probability function, the first probability function indicating a probability that a selected object is an artifact, and the second probability function being based in part on a result of the first probability function, the combination of the first and second probability functions being used to classify the biological specimen and determine whether the biological specimen requires further analysis.

26. The system of claim 25, the imaging component being configured to acquire additional images of identified objects of interest at more than three different wavelengths.

27. The system of claim 25, the first probability function indicating an average probability that an identified object of interest of a specimen is an artifact.

* * * * *